Dec. 15, 1964                M. TEN BOSCH ETAL                3,161,066
                            AUTOMATIC ERECTION SYSTEMS
Filed March 2, 1960                                          2 Sheets-Sheet 1
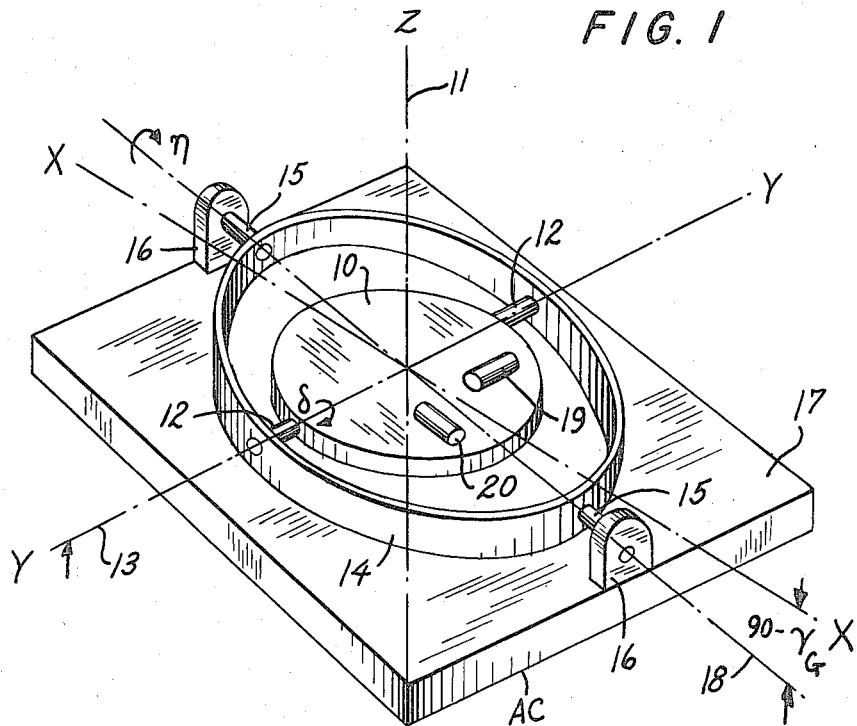
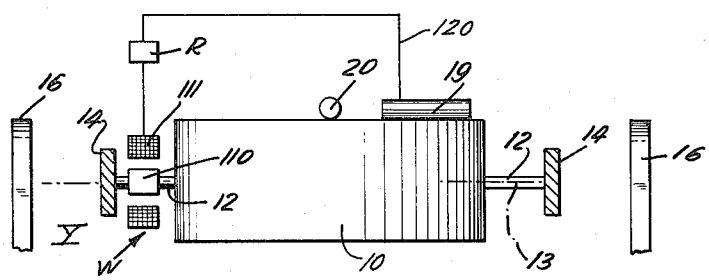
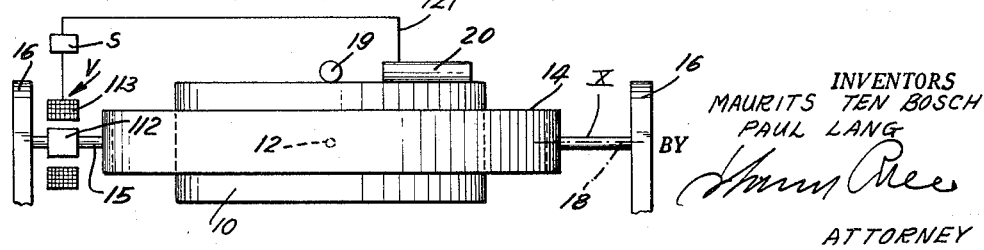
INVENTORS
MAURITS TEN BOSCH
PAUL LANG
BY
ATTORNEY

INVENTORS
MAURITS TEN BOSCH
PAUL LANG
BY
ATTORNEY

United States Patent Office 3,161,066
Patented Dec. 15, 1964

3,161,066
AUTOMATIC ERECTION SYSTEMS
Maurits Ten Bosch, White Plains, and Paul Lang, Katonah, N.Y., assignors to M. Ten Bosch, Inc., Pleasantville, N.Y., a corporation of New York
Filed Mar. 2, 1960, Ser. No. 12,356
4 Claims. (Cl. 74—5.47)

The present invention relates to automatic erection systems, and it particularly relates to automatic erection systems for vertical gyroscopes.

It is among the objects of the present invention to provide automatic erection systems for gyroscopes, and particularly for the roll and pitch axes of the gyroscopes which will produce signals for erecting the gyroscopes to gravity vertical during steady state and maneuvering conditions.

Another object is to provide an automatic gyroscope erection system which will produce signals for erecting the gyroscope to gravity vertical without cut-outs for the erection system during maneuvers.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Basically, the erection system consists of an accelerometer element which is positioned to sense each axis and which will measure the accelerations acting along the sensing axes of the accelerometer.

Associated with the erection system is a computing system which will calculate the accelerations due to maneuvers and deduct them from the accelerometer measurements leaving essentially only the gravity effect due to the deviation from the vertical.

In the preferred arrangement, these residual signals are then applied to the erecting coils of the erection system and the erection is speedily obtained.

By caging or fast initial erection, the deviation angles will always be maintained quite small.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top perspective view illustrating the erection system as applied to a gyroscope carried upon a vertical platform.

FIG. 6 is a side diagrammatic elevational view partly in section showing the manner of operation of the torquer along the pitch axis shaft.

FIG. 7 is a side diagrammatic elevational view showing the operation of the torquer as applied along the roll axis shaft.

Figure 2:
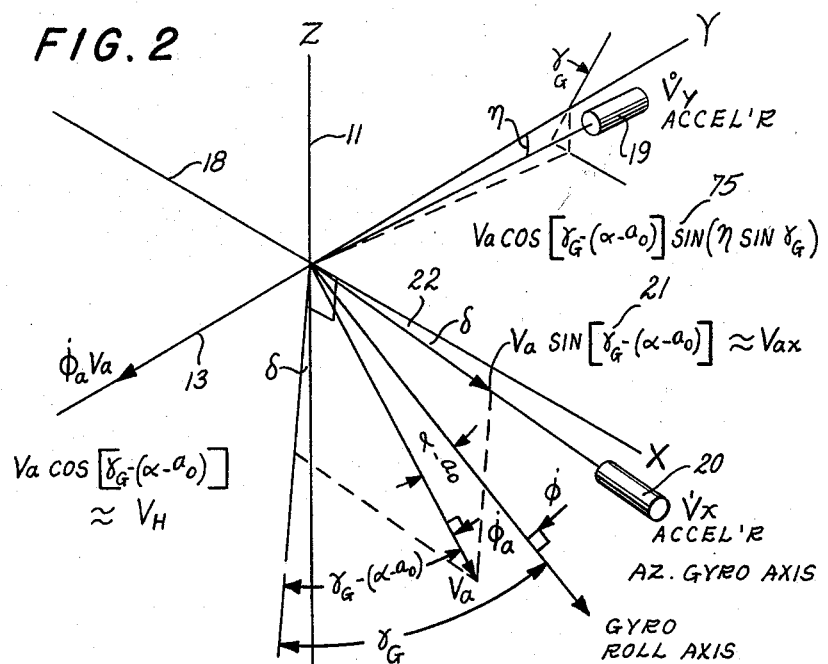
FIG. 2 is a diagrammatic layout of the various axes indicating the application of various forces in connection with the erection system.

Referring to FIG. 1, there is shown a gyroscope stabilized horizontal platform 10 constituting the pitch gimbal or which may be considered to constitute a single gyroscope.

This single gyroscope or gyroscope stabilized horizontal platform or pitch gimbal may have a vertical axis 11 also designated as Z.

The platform or gyroscope 10 will be connected by the shaft 12 along the pitch axis 13 also designated as Y to the roll gimbal 14.

The roll gimbal 14 will have axes connections or shaft connections 15 to the mounting members or lugs 16 on the platform 17 which forms part of the carrying vehicle such as an aircraft.

The roll axis 18 may move to the position designed X and the angle created between the axis 18 and position X will be the angle measured by the gyroscope.

On the platform 10 or on the gyroscope 10, there will be positioned the roll accelerometer 19 as well as the pitch accelerometer 20.

The roll accelerometer 19 will be aligned with the axis 13 while the pitch accelerometer 20 will be aligned with the axis 18.

The essential novelty of the systems as diagrammatically indicated in FIG. 1 resides in the accelerometers 19 and 20 which are combined with the computing system.

It is a particular feature of the present invention that there are no cut-outs in the erection system, and the erection system is always effective immediately to erect the gyroscope arrangement to gravity vertical regardless of the maneuvers of the aircraft or other vehicle on which the gyroscope is mounted.

Referring to FIG. 2, there is shown the vertical axis 11 also indicated by Z, the roll axis 18 also indicated by X, and the pitch axis 13 also indicated by Y.

The accelerometer 19 aligned with pitch axis 13, and the accelerometer 20 aligned with roll axis 18 are also indicated.

The component of the air speed along the axis of the pitch accelerometer 20 is indicated by the equation 21 in FIG. 2.

The angle 22 of FIG. 2 will always be small and the erection rate will be proportional to this angle.

$$\dot{\delta} = -K\delta = -\frac{K}{g}\left(\dot{V}_x + \frac{d}{dT}\{V_a \sin[\gamma_G - (\alpha - \alpha_0, \text{ for example } 5°)]\}\right)$$

$$= -\frac{K}{g}(\dot{V}_x + \dot{V}_{ax})$$

Since there are no approximations in this system, no erection cut-outs are required, and the erection rate is at all times proportional to the angle 22.

So that there will be a correct understanding of the various systems utilized, the following is a definition of the various symbols employed.

Figure 3:
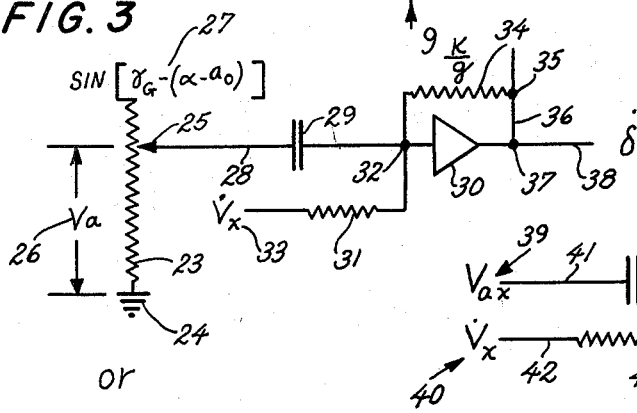
FIG. 3 is a diagrammatic circuit layout as applied to the pitch torquer.
Figure 4:
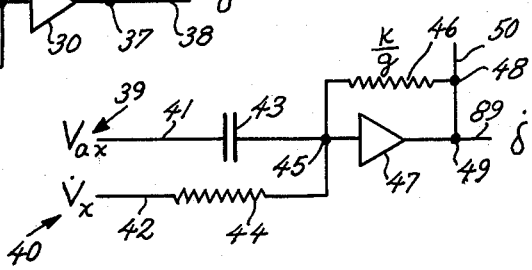
FIG. 4 is an alternative circuit diagrammatic layout as applied to the pitch torquer.

$\gamma_G$—pitch angle measured by gyroscope
$\alpha$—angle of attack
$\alpha_0$, for example 5°—roll axis offset from ADL
ADL—armament datum line (gyroscope alignment reference)
$V_a$—air speed
$V_{ax}$—horizontal component of air speed
$\dot{\phi}_a$—azimuth rate of air speed vector in its plane of motion
$\dot{\phi}$—azimuth rate measured by azimuth gyroscope δ—gyroscope vertical error in pitch
η—gyroscope error in roll
$V_H$—vertical velocity
g—acceleration of gravity Referring to the circuitry as shown in FIGS. 3 and 4 for the pitch torquer, there is shown a resistance 23 which is provided with a ground at 24 and a movable contact 25 with the space between the contact and the ground giving a measurement at 26 of the air speed.

The air speed 26 multiplied by the equation 27 will give the equation 21 of FIG. 2, that is, the component of air speed along the axis of the pitch accelerometer.

The circuit then passes as indicated at 28 through the capacity 29 to the amplifier 30.

The amplifier 30 has connections to the resistance 31 at the junction 32 which receives information in respect to the change in velocity along the pitch axis as indicated at 33.

Parallel to the amplifier 30 is the resistance 34 having a junction at 35 with the line 36 which joins at 37 with the main line 38.

In the alternative layout, the signals 39 and 40 are transmitted through the lines 41 and 42, through the capacity 43 and the resistance 44 respectively to the junction 45.

At the junction 45, they may pass through the resistance 46 and the amplifier 47 in parallel with resistance 46 to the junctions 48 and 49 on the line 50.

It is thus apparent that the pitch erection system is fairly simple and involves no complicated mechanisms.

The erection rate will be proportional to the erection error angle 22 and will accommodate maneuvers that involve vertical accelerations.

In connection with the roll erection system, the component of air speed along the axis of the athwartship accelerometer is indicated by the equation 75 in FIGURE 2.

The erection rate in connection with the roll will be indicated by the equation $$\eta = -\frac{K}{g}[\dot{V}_y - V_a \dot{\phi} \sec(\alpha - \alpha_0, \text{ for example } 5°)] =$$

$$-K\left[1 - \frac{\dot{V}_H}{g}\right]\eta \sin \gamma_G$$

This equation indicates that the erection rate is proportional to the gyroscope error in roll.

In maneuvers which involve vertical accelerations exceeding 1g, these maneuvers will be of short duration and hence will have a negligible effect upon the position of the gyroscope.

Therefore, it will not be necessary to cut-out the gyroscope erections during such vertical acceleration maneuvers.

It is thus apparent that the applicant has provided a system which will erect the gyroscope without cut-outs.

In the roll erection, the accelerations which are present are those due to air speed, centripetal acceleration resulting from rate of turn in aircraft azimuth, and both accelerations will be measured by the accelerometer 19.

In respect to the circuit system for the roll erection, there is indicated the resistance 76 having the vertical contacts 77 and the ground 78.

The spacing 79 will indicate the air speed component.

The parallel resistances 80 and 81 will lead to the junction 82 with the information indicated at 83 by the change in velocity along the axis 13.

The amplifier 84 and the resistance 85 will be in parallel and will lead to the junctions 86 and 87 on the line 88.

Figure 5:
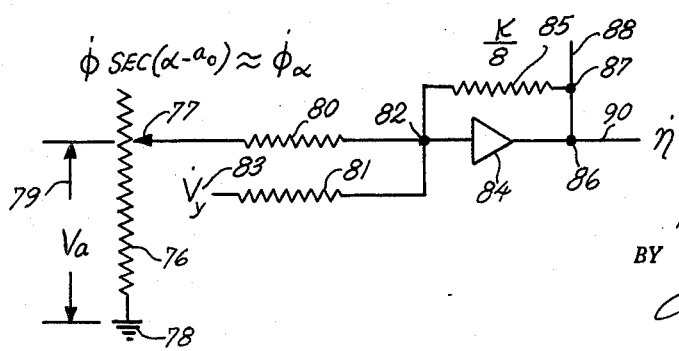
FIG. 5 is a diagrammatic circuit layout for the roll erection torquer.

Referring to FIGS. 3, 4 and 5, FIGS. 3 and 4 show comparison devices for the pitch system whereas FIG. 5 shows a comparison device for the roll system.

FIG. 4 is a modification of FIG. 3 in which the voltage or electrical signal past the capacitor 29 is obtained in another fashion as by a computer for measurement of the horizontal component of air speed, and is applied directly to point 45.

The capacitors 29 of FIG. 3 and 43 of FIG. 4 will supply the first derivative of the voltage $\dot{V}_a$ to compare it with $\dot{V}_x$ which is a signal directly obtained from the accelerometers 19 and 20.

Referring particularly to FIGS. 3 and 5, the voltage applied to the resistances 23 and 76 is proportional to the azimuth rate of air speed vector in its plane of motion in respect to the vertical.

The brush 25 is moved by an instrument which is actuated in accordance with the air speed so that the actual voltage applied to the brush 25 in FIG. 3 or the brush 77 in FIG. 5 will be proportional to a product of the air speed times the sine of the angle.

The capacitor 29 in FIG. 3 or 43 in FIG. 4 will give the first derivative of the voltage $V_x$, and this electrical information is transmitted to the adding amplifier 30 through point 32 where there will be an algebraic sum of two voltages.

If at point 32 $\dot{V}_x$ and $\dot{V}_a$ are equal and opposite, nothing will occur since they will cancel each other out. But, if these voltages are different, the difference will be applied to point 37 through the amplifier to supply a moment restoring the vertical axis of the gyroscope.

In non-accelerated movement, therefore, there will be no transmission through the adding amplifiers 30, 47 and 84 from the points 32, 45 and 82 to the points 37, 49 and 86, and $\dot{V}_a$ and $\dot{V}_x$ will be equal and opposite.

The feedback elements 34, 46 and 85 are for the purpose of giving a high gain to the adding amplifiers 30, 47 and 84.

Referring to FIG. 6, the gyroscope housing or horizontal platform 10 carries the accelerometer 19 which is aligned or parallel to the pitch axis Y.

The lugs 16 are shown in FIG. 6, 90 degrees out of position.

The electrical signal will be transmitted through the wire channel 120 to the circuit indicated diagrammatically at R which is the circuit illustrated in FIG. 5, and it will then pass to the armature or winding of the motor W serving as the pitch axis torquer.

This motor has a winding 111, a rotor 110, and the signal transmitted to the circuit R as there is a difference between the voltages $\dot{V}_a$ and $\dot{V}_y$ which will hold the axis of the gyroscope 10 in vertical position.

In the arrangement of FIG. 7, the accelerometer 20 which is aligned with or parallel to the roll axis X will transmit a signal through the wire or conduit 121 to the circuit diagrammatically indicated at S which is equivalent to the circuit shown in FIG. 3, and in turn, this any difference signal will be transmitted to the erection torquer on the shaft 15 connecting the roll gimbal 14 to the mounting members 16 onto the vehicle.

Any difference created in the circuit of FIG. 3 between $\dot{V}_a$ and $\dot{V}_x$ will be applied to the winding 113 acting on the rotor 112 to maintain the axis of the gyroscope in vertical position.

The essential novel feature of the present invention resides in the position and functioning of the accelerometer 19 and 20 in the erection system plus the computer circuits as indicated in FIGS. 2 to 5.

This invention eliminates the ordinary erection systems provided with cut-outs.

The circuits as indicated in FIGS. 3 to 5 will calculate accelerations due to maneuvers and deduct them from the accelerometer measurements leaving essentially only the gravity effect due to deviation from the vehicle.

As many changes could be made in the above automatic erection systems and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A gyroscope erection system for a vertical gyroscope for aircraft and other vehicles without cutouts, comprising a central gyroscope unit, pitch and roll accelerometers separately mounted on said gyroscope and located at right angles to each other, a roll gimbal, pitch axis mountings between the central gyroscope unit and the roll gimball, roll axis mountings between the roll gimbal and the aircraft and erection means on the roll and pitch axes respectively receiving signals from said accelerometers to cause erection of said roll and pitch axes to erect the gyroscope to the gravity vertical during the steady state and maneuvering conditions said erection means including computer circuit connections between the accelerometers and the respective erection means to feed to erection means only such portion of the output of the accelerometers as corresponds to deviation of the vertical axis of gyroscope from the true gravity vertical.

2. An automatic erection system for a vertical gyroscope acting on the roll and pitch axes to erect the gyroscope to the gravity vertical during steady state and maneuvering conditions without cutouts for the erection system during maneuvers, said system having a central gyroscope unit, roll and pitch accelerometers mounted at right angles to each other on the unit and generating electrical signals and roll and pitch erection means including electrical motors mounted on the roll and pitch axes, an electrical computer circuit receiving input signals as to changes in the air speed, aircraft angle, and vertical velocity from the roll and pitch accelerometers and subtracting therefrom all components with exception of the angular deviation signal representing the change in the angle of the spin axis from true gravity vertical and then transmitting this as an erection signal to the erection means, said circuit for the pitch erection means including, a capacity receiving an air speed signal in series with a parallel connection of an amplifier and a resistance and the circuit for the roll erection means including a resistance with a parallel connection with a resistance and an amplifier and transmitting respectively a signal corresponding to the gyroscope vertical error in pitch and a signal corresponding to the gyroscope error in roll and said parallel circuits also receiving signals from the respective accelerometers just before said parallel connections.

3. In an automatic erection system for vertical gyroscopes of the type having accelerometers aligned with the roll and pitch axes for producing signals for erecting the gyroscopes to gravity vertical during the steady state and maneuvering conditions of aircraft without cutouts, said system having a computer calculating accelerations due to maneuvers and deducing them from the accelerometer measurements leaving only the gravity effect due to deviation from the vertical, a gyroscope stabilized housing constituting the pitch gimbal, a roll gimbal, shafts along the pitch axis connecting the roll gimbal and the housing, aircraft mounting members, shafts along the roll axis connecting the roll gimbal and the aircraft mounting members, roll and pitch accelerometers mounted on the housing at right angles to each other and parallelly aligned with the roll and pitch axes respectively, electrical motor means to erect the shafts on the pitch and roll axes, and circuitry connections including said computer between the accelerometers and the means to erect, said circuit for the pitch erection means including, a capacity receiving an air speed signal in series with a parallel connection of an amplifier and a resistance and the circuit for the roll erection means including a resistance with a parallel connection with a resistance and an amplifier and transmitting respectively a signal corresponding to the gyroscope vertical error in pitch and a signal corresponding to the gyroscope error in roll and said parallel circuits also receiving signals from the respective accelerometers just before said parallel connections.

4. An automatic erection system for a vertical gyroscope effective at all times without cutouts regardless of the maneuvers of the aircraft comprising a central gyroscope having a housing, a roll gimbal encircling said housing, pitch axis shafts along the pitch axis connecting the housing to said roll gimbal, and aircraft vehicle platform having spaced mounting members on each side of the roll gimbal and connected to the roll gimbal by roll axis shafts along the roll axis extending perpendicularly to the pitch axis shafts, accelerometers mounted at right angles to each other on the housing and mounted parallel to the shafts and motor erection means mounted on said shafts, circuitry between said accelerometers and said motor erection means, said accelerometers actuating said motor erection means to maintain proper erection of the gyroscope.

References Cited in the file of this patent

UNITED STATES PATENTS

| 2,446,180 | Haskins | Aug. 3, 1948 |
| 2,501,885 | Barnes et al. | Mar. 28, 1950 |
| 2,528,487 | Adkins | Nov. 7, 1950 |
| 2,608,868 | Buhl | Sept. 2, 1952 |
| 2,633,029 | Lajeunesse | Mar. 31, 1953 |
| 2,800,025 | Agins | July 23, 1957 |
| 2,880,617 | Cotton | Apr. 7, 1959 |
| 2,968,957 | Condie et al. | Jan. 24, 1961 |
| 3,009,361 | Agins | Nov. 21, 1961 |

FOREIGN PATENTS

| 801,550 | Great Britain | Sept. 17, 1958 |